United States Patent
Sharifi et al.

(10) Patent No.: US 12,026,593 B2
(45) Date of Patent: Jul. 2, 2024

(54) ACTION SUGGESTIONS FOR USER-SELECTED CONTENT

(71) Applicant: Google LLC, Mountain View, CA (US)

(72) Inventors: Matthew Sharifi, Kilchberg (CH); Daniel Ramage, Seattle, WA (US); David Petrou, Brooklyn, NY (US)

(73) Assignee: GOOGLE LLC, Mountain View, CA (US)

(*) Notice: Subject to any disclaimer, the term of this patent is extended or adjusted under 35 U.S.C. 154(b) by 469 days.

(21) Appl. No.: 17/071,330

(22) Filed: Oct. 15, 2020

(65) Prior Publication Data

US 2021/0027203 A1    Jan. 28, 2021

Related U.S. Application Data

(63) Continuation of application No. 14/872,582, filed on Oct. 1, 2015, now Pat. No. 10,970,646.

(51) Int. Cl.
*G06N 20/00* (2019.01)
*G06F 3/0481* (2022.01)
(Continued)

(52) U.S. Cl.
CPC ........... *G06N 20/00* (2019.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS 5,731,844 A    3/1998    Rauch et al.
5,946,647 A    8/1999    Miller et al.
(Continued)

FOREIGN PATENT DOCUMENTS

CN    101075236    11/2007
CN    101201827    6/2008
(Continued)

OTHER PUBLICATIONS

Amazon Kindle User's Guide. 2011. 27 pages. (Year: 2011).*
(Continued)

*Primary Examiner* — Vincent Gonzales
(74) *Attorney, Agent, or Firm* — Gray Ice Higdon

(57) ABSTRACT

Systems and methods are provided for suggesting actions for selected text based on content displayed on a mobile device. An example method can include converting a selection made via a display device into a query, providing the query to an action suggestion model that is trained to predict an action given a query, each action being associated with a mobile application, receiving one or more predicted actions, and initiating display of the one or more predicted actions on the display device. Another example method can include identifying, from search records, queries where a website is highly ranked, the website being one of a plurality of websites in a mapping of websites to mobile applications. The method can also include generating positive training examples for an action suggestion model from the identified queries, and training the action suggestion model using the positive training examples.

16 Claims, 8 Drawing Sheets

(51) Int. Cl.
  *G06F 3/0482* (2013.01)
  *G06F 3/0484* (2022.01)
  *G06F 3/04895* (2022.01)
  *G06F 9/451* (2018.01)
  *G06F 16/245* (2019.01)
  *G06F 16/332* (2019.01)
  *G06N 5/02* (2023.01)

(52) U.S. Cl.
  CPC ........ *G06F 3/0484* (2013.01); *G06F 3/04895* (2013.01); *G06F 9/453* (2018.02); *G06F 16/245* (2019.01); *G06F 16/3322* (2019.01); *G06N 5/02* (2013.01)

(56) References Cited

U.S. PATENT DOCUMENTS

| | | |
|---|---|---|
| 6,662,226 B1 | 12/2003 | Wang et al. |
| 7,054,917 B1 | 5/2006 | Kirsch et al. |
| 7,421,153 B1 | 9/2008 | Ronca et al. |
| 7,548,915 B2 | 6/2009 | Ramer et al. |
| 7,822,759 B2 | 10/2010 | MacLaurin et al. |
| 7,917,514 B2 | 3/2011 | Lawler et al. |
| 7,930,313 B1 * | 4/2011 | Geva .................. G06F 16/2425 |
| | | 707/766 |
| 8,090,222 B1 | 1/2012 | Baluja et al. |
| 8,131,786 B1 | 3/2012 | Bengio et al. |
| 8,132,121 B2 | 3/2012 | Risch |
| 8,150,911 B2 | 4/2012 | Bell et al. |
| 8,204,966 B1 | 6/2012 | Mendis et al. |
| 8,255,386 B1 | 8/2012 | Annau et al. |
| 8,280,414 B1 | 10/2012 | Nourse et al. |
| 8,341,156 B1 | 12/2012 | Westgate et al. |
| 8,347,237 B2 | 1/2013 | Bier et al. |
| 8,380,502 B1 * | 2/2013 | Franz .................. G10L 15/22 |
| | | 707/723 |
| 8,418,055 B2 | 4/2013 | King et al. |
| 8,452,799 B2 | 5/2013 | Zhou et al. |
| 8,468,110 B1 | 6/2013 | Podgorny et al. |
| 8,543,397 B1 | 9/2013 | Nguyen |
| 8,571,319 B2 | 10/2013 | Balasubramanian et al. |
| 8,645,325 B2 | 2/2014 | Anderson et al. |
| 8,671,341 B1 | 3/2014 | Hellwig et al. |
| 8,700,604 B2 | 4/2014 | Roseman et al. |
| 8,767,497 B2 | 7/2014 | Marumoto et al. |
| 8,799,061 B1 | 8/2014 | Chatterjee et al. |
| 8,954,836 B1 | 2/2015 | Look et al. |
| 8,959,104 B2 * | 2/2015 | Lazier .................. G06F 16/951 |
| | | 707/765 |
| 8,977,639 B2 | 3/2015 | Petrou et al. |
| 9,137,377 B2 | 9/2015 | Kovalenko |
| 9,165,406 B1 | 10/2015 | Gray et al. |
| 9,176,984 B2 | 11/2015 | Hull et al. |
| 9,224,100 B1 | 12/2015 | Chatterjee et al. |
| 9,276,883 B2 | 3/2016 | Zhang et al. |
| 9,336,483 B1 | 5/2016 | Abeysooriya et al. |
| 9,354,778 B2 | 5/2016 | Cornaby et al. |
| 9,424,668 B1 | 8/2016 | Petrou et al. |
| 9,582,482 B1 | 2/2017 | Sharifi et al. |
| 9,703,541 B2 | 7/2017 | Sharifi et al. |
| 10,970,646 B2 | 4/2021 | Sharifi et al. |
| 2002/0083045 A1 | 6/2002 | Utiyama et al. |
| 2004/0008258 A1 * | 1/2004 | Aas .................. G06V 40/172 |
| | | 348/207.1 |
| 2004/0117750 A1 | 6/2004 | Skoll et al. |
| 2005/0083413 A1 | 4/2005 | Reed et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0156222 A1 | 7/2006 | Chi et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0009155 A1 | 1/2007 | Potts |
| 2007/0047781 A1 | 3/2007 | Hull et al. |
| 2007/0143345 A1 | 6/2007 | Jones et al. |
| 2007/0168379 A1 | 7/2007 | Patel et al. |
| 2007/0233671 A1 | 10/2007 | Oztekin et al. |
| 2008/0176606 A1 | 7/2008 | Kim |
| 2008/0235018 A1 | 9/2008 | Eggen et al. |
| 2008/0275701 A1 | 11/2008 | Wu et al. |
| 2008/0281974 A1 | 11/2008 | Slothouber et al. |
| 2008/0282160 A1 | 11/2008 | Tonnison |
| 2008/0301101 A1 | 12/2008 | Baratto et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0138466 A1 | 5/2009 | Henry et al. |
| 2009/0187515 A1 | 7/2009 | Andrew et al. |
| 2009/0228573 A1 | 9/2009 | Asakawa et al. |
| 2009/0228777 A1 | 9/2009 | Henry et al. |
| 2009/0252413 A1 | 10/2009 | Hua et al. |
| 2009/0282012 A1 | 11/2009 | Konig et al. |
| 2009/0319449 A1 | 12/2009 | Gamon et al. |
| 2010/0010987 A1 | 1/2010 | Smyth et al. |
| 2010/0060655 A1 | 3/2010 | Huang |
| 2010/0088612 A1 | 4/2010 | Jia et al. |
| 2010/0250598 A1 | 9/2010 | Brauer et al. |
| 2010/0262928 A1 | 10/2010 | Abbott |
| 2010/0280983 A1 | 11/2010 | Cho et al. |
| 2010/0306249 A1 | 12/2010 | Hill et al. |
| 2010/0313141 A1 | 12/2010 | Yu et al. |
| 2011/0072455 A1 | 3/2011 | Pickelsimer et al. |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0131241 A1 | 6/2011 | Petrou et al. |
| 2011/0145692 A1 | 6/2011 | Noyes et al. |
| 2011/0191676 A1 | 8/2011 | Guttman et al. |
| 2011/0202864 A1 | 8/2011 | Hirsch |
| 2011/0225152 A1 | 9/2011 | Beaudreau et al. |
| 2011/0238768 A1 | 9/2011 | Habets et al. |
| 2011/0246471 A1 | 10/2011 | Rakib |
| 2011/0258049 A1 | 10/2011 | Ramer et al. |
| 2011/0275358 A1 | 11/2011 | Faenger |
| 2011/0283296 A1 | 11/2011 | Chun |
| 2011/0307478 A1 | 12/2011 | Pinckney et al. |
| 2011/0307483 A1 | 12/2011 | Radlinski et al. |
| 2012/0044137 A1 | 2/2012 | Oddiraju et al. |
| 2012/0083294 A1 | 4/2012 | Bray et al. |
| 2012/0084292 A1 | 4/2012 | Liang et al. |
| 2012/0092286 A1 | 4/2012 | O'Prey et al. |
| 2012/0117058 A1 | 5/2012 | Rubinstein et al. |
| 2012/0158751 A1 | 6/2012 | Tseng |
| 2012/0159340 A1 | 6/2012 | Bae et al. |
| 2012/0191840 A1 | 7/2012 | Gordon |
| 2012/0194519 A1 | 8/2012 | Bissell et al. |
| 2012/0216102 A1 | 8/2012 | Malla |
| 2012/0227007 A1 | 9/2012 | Nicholson |
| 2013/0080447 A1 | 3/2013 | Ramer et al. |
| 2013/0091463 A1 | 4/2013 | Nordstrom et al. |
| 2013/0097507 A1 | 4/2013 | Prewett |
| 2013/0108161 A1 | 5/2013 | Carr |
| 2013/0111328 A1 | 5/2013 | Khanna et al. |
| 2013/0117252 A1 | 5/2013 | Samaddar et al. |
| 2013/0173604 A1 | 7/2013 | Li et al. |
| 2013/0227471 A1 * | 8/2013 | Cha .................. G06F 3/0484 |
| | | 715/790 |
| 2013/0254217 A1 | 9/2013 | Xu |
| 2013/0263098 A1 | 10/2013 | Duda et al. |
| 2013/0290110 A1 | 10/2013 | LuVogt et al. |
| 2013/0318064 A1 * | 11/2013 | Atherton .............. G06F 16/951 |
| | | 707/E17.108 |
| 2013/0325844 A1 | 12/2013 | Plaisant |
| 2013/0346431 A1 | 12/2013 | Erol et al. |
| 2014/0029810 A1 | 1/2014 | Barr et al. |
| 2014/0040238 A1 | 2/2014 | Scott et al. |
| 2014/0040272 A1 | 2/2014 | Houghton |
| 2014/0046965 A1 | 2/2014 | Tian et al. |
| 2014/0053088 A1 | 2/2014 | Civelli et al. |
| 2014/0082670 A1 | 3/2014 | Papish |
| 2014/0089626 A1 | 3/2014 | Schluessler et al. |

(56) References Cited

U.S. PATENT DOCUMENTS

| | | | |
|---|---|---|---|
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157142 A1 | 6/2014 | Heinrich et al. |
| 2014/0157210 A1 | 6/2014 | Katz et al. |
| 2014/0188889 A1 | 7/2014 | Martens et al. |
| 2014/0188956 A1 | 7/2014 | Subba et al. |
| 2014/0208234 A1 | 7/2014 | Amit et al. |
| 2014/0250147 A1 | 9/2014 | Shapira et al. |
| 2014/0279013 A1 | 9/2014 | Chelly et al. |
| 2014/0282136 A1 | 9/2014 | Marantz et al. |
| 2014/0282660 A1 | 9/2014 | Oztaskent et al. |
| 2014/0298200 A1 | 10/2014 | Cierniak |
| 2014/0316890 A1 | 10/2014 | Kagan |
| 2014/0330819 A1 | 11/2014 | Raina et al. |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0039580 A1 | 2/2015 | Subhedar |
| 2015/0066630 A1 | 3/2015 | Ge et al. |
| 2015/0095855 A1 | 4/2015 | Bai et al. |
| 2015/0100524 A1 | 4/2015 | Pantel et al. |
| 2015/0161271 A1 | 6/2015 | Gur et al. |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0242760 A1* | 8/2015 | Miao ............ G06N 20/00 706/12 |
| 2015/0324334 A1 | 11/2015 | Lee et al. |
| 2015/0339405 A1 | 11/2015 | Vora et al. |
| 2016/0055246 A1 | 2/2016 | Marcin et al. |
| 2016/0321052 A1 | 11/2016 | Sharifi et al. |
| 2016/0335349 A1 | 11/2016 | Desineni et al. |
| 2016/0357808 A1 | 12/2016 | Morris et al. |
| 2017/0118576 A1 | 4/2017 | Sharifi et al. |
| 2017/0139879 A1 | 5/2017 | Sharifi et al. |

FOREIGN PATENT DOCUMENTS

| | | |
|---|---|---|
| CN | 101253499 | 8/2008 |
| CN | 101587495 | 11/2009 |
| CN | 101763357 | 6/2010 |
| CN | 102027470 | 4/2011 |
| CN | 2012075315 | 6/2012 |
| CN | 102754065 | 10/2012 |
| CN | 103198418 | 7/2013 |
| CN | 103488752 | 1/2014 |
| CN | 104239454 | 12/2014 |
| CN | 104508604 | 4/2015 |
| CN | 104866206 | 8/2015 |
| CN | 104969184 | 10/2015 |
| CN | 105706052 | 6/2016 |
| CN | 103995830 | 9/2017 |
| CN | 104462325 | 5/2019 |
| EP | 2306290 | 4/2011 |
| EP | 2466921 | 6/2012 |
| EP | 2728481 | 5/2014 |
| EP | 2820578 | 1/2015 |
| EP | 2824558 | 1/2015 |
| JP | 10105562 | 4/1998 |
| JP | 2002197104 | 7/2002 |
| JP | 2008140377 | 6/2008 |
| JP | 2009026096 | 2/2009 |
| JP | 2011524042 | 8/2011 |
| JP | 2012008771 | 1/2012 |
| JP | 2012039581 | 2/2012 |
| JP | 2013211616 | 10/2013 |
| JP | 2014512046 | 5/2014 |
| JP | 2014518419 | 7/2014 |
| JP | 2015043236 | 3/2015 |
| JP | 2015508930 | 3/2015 |
| KR | 20120091035 | 8/2012 |
| KR | 20140038463 | 3/2017 |
| WO | 03088080 | 10/2003 |
| WO | 2009054619 | 4/2009 |
| WO | 2012075315 | 6/2012 |
| WO | 2013122840 | 1/2013 |
| WO | 2013173940 | 11/2013 |
| WO | 2014105922 | 7/2014 |
| WO | WO-2014105922 A1 * | 7/2014 ....... G06F 17/30221 |
| WO | 2014146265 | 9/2014 |
| WO | 2015127755 | 3/2015 |
| WO | 2015102931 | 9/2015 |
| WO | 2016064857 | 4/2016 |

OTHER PUBLICATIONS

European Patent Office; Preliminary Opinion issued in Application No. 16852799.2, 9 pages, dated May 11, 2022.
China National Intellectual Property Administration; Decision of Rejection issued in Application No. 202110558143.4, 7 pages, dated May 11, 2022.
Korean Intellectual Property Office; Notice of Allowance for Korean Application No. 102207024504; 3 pages; dated Mar. 11, 2021.
China National Intellectual Property Administration; Office Action issued in Application No. 201680057955.8; 30 pages; dated Oct. 10, 2020.
Korean Intellectual Property Office; Notice of Office Action for Korean Application No. 10-2020-7024504; 13 pages; dated Sep. 8, 2020.
Intellectual Property India; Examination Report issued in Application No. 201747044727; 6 pages; dated Sep. 30, 2020.
European Patent Office; Summons to attend oral proceedings pursuant to Rule 115(1) EPC issued in Application No. 16852799.2; 12 pages; dated Nov. 25, 2021.
China National Intellectual Property Administration; Notification of First Office Action issued in Application No. 202110558143.4; 27 pages; dated Dec. 17, 2021.
Korean Intellectual Property Office; Notice of Allowance for Korean Application No. 1020187011820; dated Jun. 2, 2020.
Korean Intellectual Property Office; Notice of Office Action for Korean Application No. 1020187011820; dated Feb. 10, 2020.
European Patent Office; Examination Report issued in Application No. 16852799.2 dated Jan. 14, 2020.
European Patent Office; Extended European Search Report issued in Application No. 16852799.2 dated Mar. 25, 2019.
Japanese Patent Office; Office Action issued in Application No. 2018-516731 dated Apr. 1, 2019.
Judit Bar-llan, et al., Methods for Comparing Rankings of Search Engine Results, 2005, pp. 1-19.
"The new IFTTT is here", IFTTT Blog (https://ifttt.com/blog/2016/11/the-new-ifttt-is-here), printed Nov. 3, 2016, 6 pages. Nov. 6, 2016.
Final Office Action for U.S. Appl. No. 14/465,265 dated Apr. 27, 2017. 23 pages.
International Search Report and Written Opinion for PCT Application No. PCT/US2016/062475 dated Mar. 9, 2017. 15 Pages.
International Search Report and Written Opinion for Application No. PCT/US2016/055055 dated Dec. 5, 2016. 12 pages.
Collobert et al., "Natural Language Processing (almost) from Scratch", Journal of Maching Learning Research, vol. 12, Aug. 1, 2011. pp. 2493-2537.
Minkov et al., "Extracting Personal Names from Email: Applying Named Entity Recognition to Informal Text", Proceedings of Human Language Technology Conference and Conference on Empirical Methods in Natural Language Processing, retrieved from https://www.cs.cmu.edu/~rcwang/papers/emnip-2005.pdf, Oct. 1, 2005. pp 443-450.
Non-Final Office Action for U.S. Appl. No. 14/465,265 dated Oct. 6, 2016. 19 pages.
Final Office Action for U.S. Appl. No. 14/451,393 dated Oct. 21, 2016. 31 Pages.
Non-Final Office Action for U.S. Appl. No. 14/724,965 dated Sep. 16, 2016. 15 pages.

(56) References Cited

OTHER PUBLICATIONS

Non-Final Office Action for U.S. Appl. No. 14/451,396 dated Jul. 1, 2016. 7 Pages.
Non-Final Office Action for U.S. Appl. No. 14/451,393 dated May 25, 2016. 26 pages.
Non-Final Office Action for U.S. Appl. No. 14/451,389 dated Jul. 1, 2016. 11 pages.
Non-Final Office Action for U.S. Appl. No. 14/451,385 dated Jul. 1, 2016. 12 pages.
Non-Final Office Action for U.S. Appl. No. 14/724,965 dated Mar. 31, 2016. 13 pages.
U.S. Appl. No. 14/465,265, filed Aug. 21, 2014. 46 pages.
U.S. Appl. No. 14/451,385, filed Aug. 4, 2014. 109 pages.
U.S. Appl. No. 14/724,965, filed May 29, 2015. 54 pages.
U.S. Appl. No. 14/945,348, filed Nov. 18, 2015. 47 pages.
Adistambha et al., "Efficient Multimedia Query-by-Content from Mobile Devices", Computers & Electrical Engineering, vol. 36, Issue 4, Jul. 2010, pp. 626-642.
Hsu et al., "Snap2Read: Automatic Magazine Capturing and Analysis for Adaptive Mobile Reading," Proceedings of the 17th International Conference on Advances in Multimedia Modeling—vol. Part II, Jan. 5, 2011. 11 pages.
China National Intellectual Property Administration; Notice of Allowance issued in Application No. 201680057955.8; 30 pages; dated Mar. 10, 2021.
Japanese Patent Office; Notice of Allowance issued in Application No. 2020-076101; 3 pages; dated Apr. 12, 2021.

\* cited by examiner

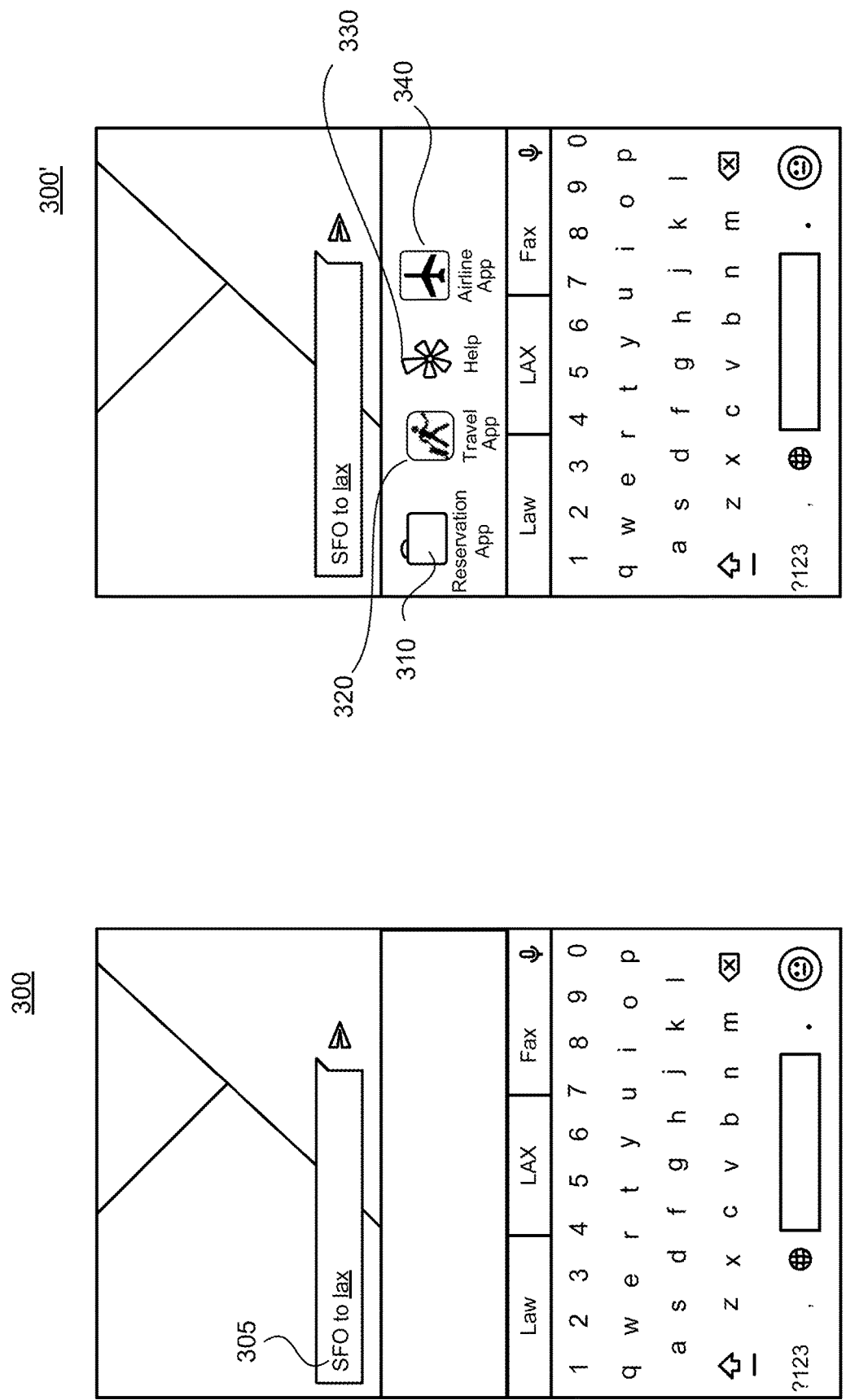

ACTION SUGGESTIONS FOR USER-SELECTED CONTENT

BACKGROUND

Due to the use of mobile devices, such as smartphones and tablets, user interaction with mobile applications has been increasing. As users move away from web-based browsers to using mobile devices they often lose the ability to easily transfer data from one mobile app to another. In general, mobile applications are single purpose and very good at one specific thing, but moving information between mobile applications can be cumbersome and a user may not know which app is good for a given purpose, or even when to look for an app to help them out.

SUMMARY

Implementations provide action suggestions in a mobile app environment. The actions may be intents for other mobile applications. The actions are based on a model trained using a mapping of websites to mobile applications and examples of searches where the websites were highly ranked. The model is compact and, once trained, may be pushed to a mobile device where the model may be personalized. Personalization may include using search records stored on the mobile device as additional positive examples with higher weights. In some implementations, the model may include training examples for "other" actions that are negative examples for a query, e.g., where the query does not correlate with the website/mobile application.

The system may use the model to predict actions for words or images selected on a screen. Selection may result from a user specifically selecting text or from the system automatically selecting some words and offering suggestions. In some implementations, the system may include a user interface that enables the user to provide the selection as a query, e.g., by typing or speaking, so that the words typed or spoken are the selection. When an image is selected, the system may use a text description of the image or entity recognition on the image to determine a query for the selected image. The system may include a user interface that enables the user to modify the selection and/or may offer common extensions for the selection. The selected text or query may then be provided to the model and the model may predict one or more actions for the query. The actions may be presented as an overlay to the current screen and may include a selectable control for each action (e.g., an icon). If a user selects a control, the selected query may be sent with an intent to an application (e.g., a search intent mobile application) corresponding to the selected control. The query may be provided to the model, which may then predict actions for the query.

According to certain aspects of the disclosure, a mobile device includes at least one processor, a display device, and memory storing instructions that, when executed by the at least one processor, cause the mobile device to perform operations. The operations include converting a selection made via the display device into a query, providing the query to an action suggestion model, the action suggestion model being trained to predict an action given a query, each action being associated with a mobile application, receiving one or more predicted actions, and initiating display of the one or more predicted actions on the display device.

According to certain aspects of the disclosure, a method includes identifying, from search records, queries where a website is highly ranked in corresponding search results, the website being one of a plurality of websites in a mapping of websites to mobile applications. The method also includes generating positive training examples for an action suggestion model from the queries, each positive training example having a query, a website, a weight corresponding to a rank of the website in the search result for the query, and a mobile application, and training the action suggestion model using the positive training examples.

According to certain aspects of the disclosure, a method may include converting, responsive to receiving an action suggestion indication, a selection made via a display device of a mobile computing device into a query, predicting at least one mobile application for the query using an action suggestion model, the action suggestion model being trained to predict mobile applications given a query, and initiating display of a selectable control for the at least one mobile application on the display device.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for detecting text displayed on a screen and providing a direct link to a mobile application that uses the text selection in an intent, substantially as shown in and/or described in connection with at least one of the figures, and as set forth more completely in the claims.

One or more of the implementations of the subject matter described herein can be implemented so as to realize one or more of the following advantages. As one example, implementations may provide a way for a user to seamlessly transfer information between mobile applications, enabling a user to lookup additional information with minimal effort. As another example, implementations may improve the user experience by suggesting applications that can help the user find/handle information, even though the user may not have knowledge of the application. Thus implementations help the user discover more effective or popular tools. As another example, implementations improve the user experience by helping the user perform tasks more quickly, e.g. with fewer gestures from the user. In some implementations, the actions suggested may be customized for the user of the mobile device, making it more likely that the user finds the suggested actions helpful. Implementations also provide actions for any selected text, not just text that corresponds to an entity in a personal or public knowledge graph. Thus, implementations have broader utility than entity-based action suggestion systems. Implementations improve the user experience by predicting applications that help the user find out more information about a selection and by enabling the user to navigate to the application with minimal input from the user.

The details of one or more implementations are set forth in the accompanying drawings and the description below. Other features will be apparent from the description and drawings, and from the claims.

BRIEF DESCRIPTION OF DRAWINGS

FIGS. 3A and 3B are example displays of a mobile computing device in accordance with the disclosed subject matter.

Like reference symbols in the various drawings indicate like elements.

DETAILED DESCRIPTION

Implementations include systems and methods that predict mobile applications for an on-screen selection. The selection may be text or an image displayed on the screen or a query entered, either via text or voice entry, into a user interface. If not already in query form, the selection may be converted to a query. The system may provide the query to a model trained to predict actions for a query. The actions may be for a mobile application or a type of mobile application. The model may be trained based on information obtained from search records. The model may provide one or more actions for the query in the form of a selectable control. When a user selects one of the selectable controls, the system may launch the mobile application corresponding to the control with an intent using the query. An intent is an action supported by a mobile application. A search or share intent is a common type of intent. The search intent allows the system to link to a mobile application in its search state given a query. The system may use nonstandard intents as well. For example, a mobile applicant may indicate an intent in a manifest file. Such nonstandard intents are supported by the mobile application but not necessarily by the operating system. In general, an action may be any intents that can take the query as a parameter. The system operates across all applications used on a mobile device, making the user experience consistent. The action suggestion functionality thus need not be limited to a particular mobile application. Nor is the action suggestion limited to recognized entities, e.g., entities represented in a personal or public knowledge base. Moreover, the suggested actions may be for mobile applications that the user has not yet installed and, thus, can serve as a way to inform the user about useful mobile applications.

Figure 1:
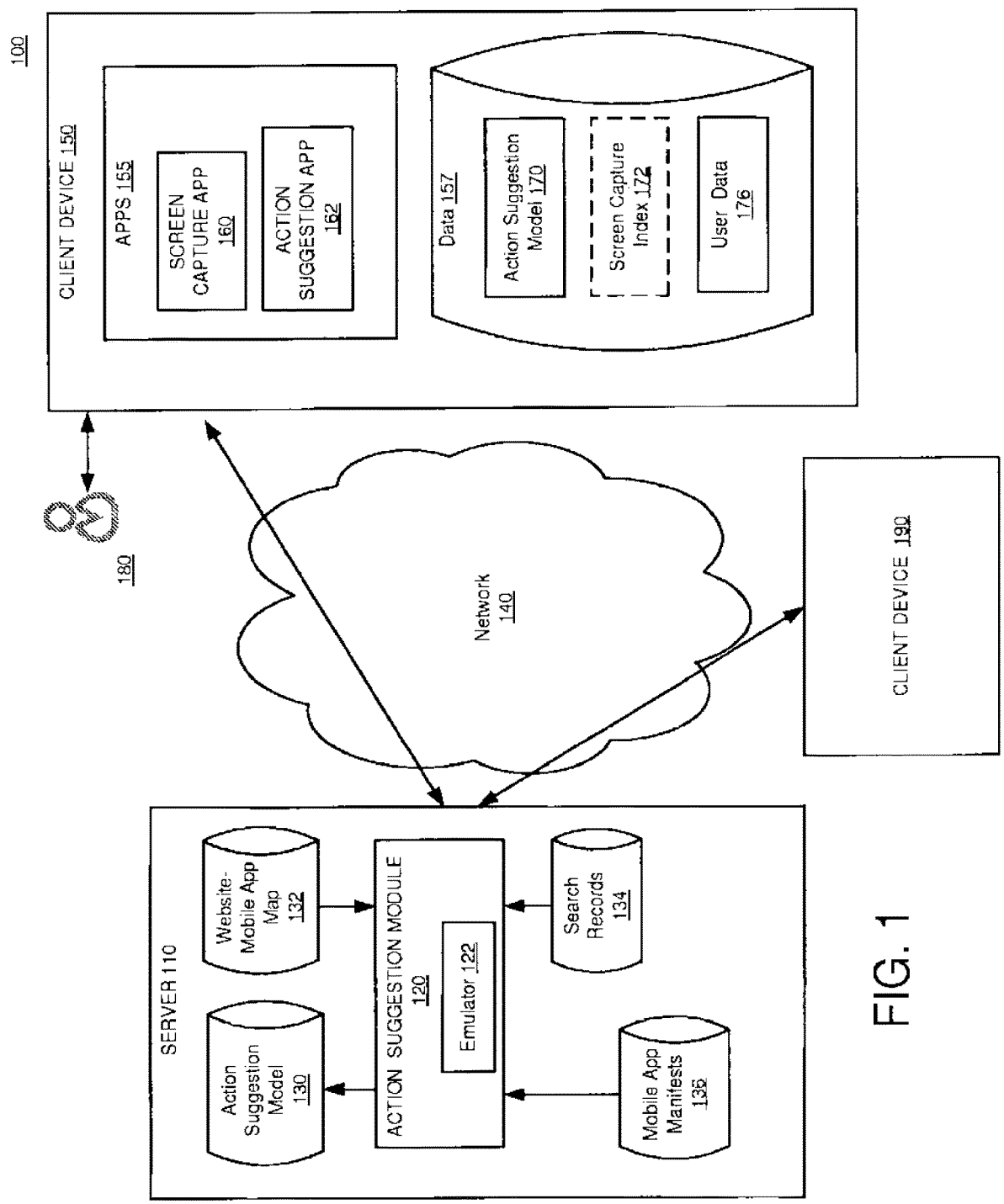
FIG. 1 is a block diagram illustrating an example system in accordance with the disclosed subject matter.

FIG. 1 is a block diagram of a action suggestion system in accordance with an example implementation. The system 100 may be used to provide actions for a selection of content displayed on a mobile device or for a selection entered by a user. The actions may represent intents (e.g., standard or nonstandard) for mobile applications, and can include mobile applications the user has not yet installed on the mobile device. In some implementations, the actions may also launch a web mirror for the mobile application. The mobile application that is represented by the action can be referred to as the destination application and the mobile application that generated the content selected by the user may be considered a source application. The actions provided for a particular selection may be based on a trained model, e.g., a machine learning model trained to predict one or more actions given a query. The system may therefore convert the selection into a query. The depiction of system 100 in FIG. 1 is a client-server system, with some data processing occurring at a server 110. However, other configurations and applications may be used. For example, the data processing may occur exclusively on the client device 150. In some implementations, a user of the client device 150 may indicate that portions of the processing be performed at the server 110. Thus, implementations are not limited to the exact configurations illustrated.

Figure 7:
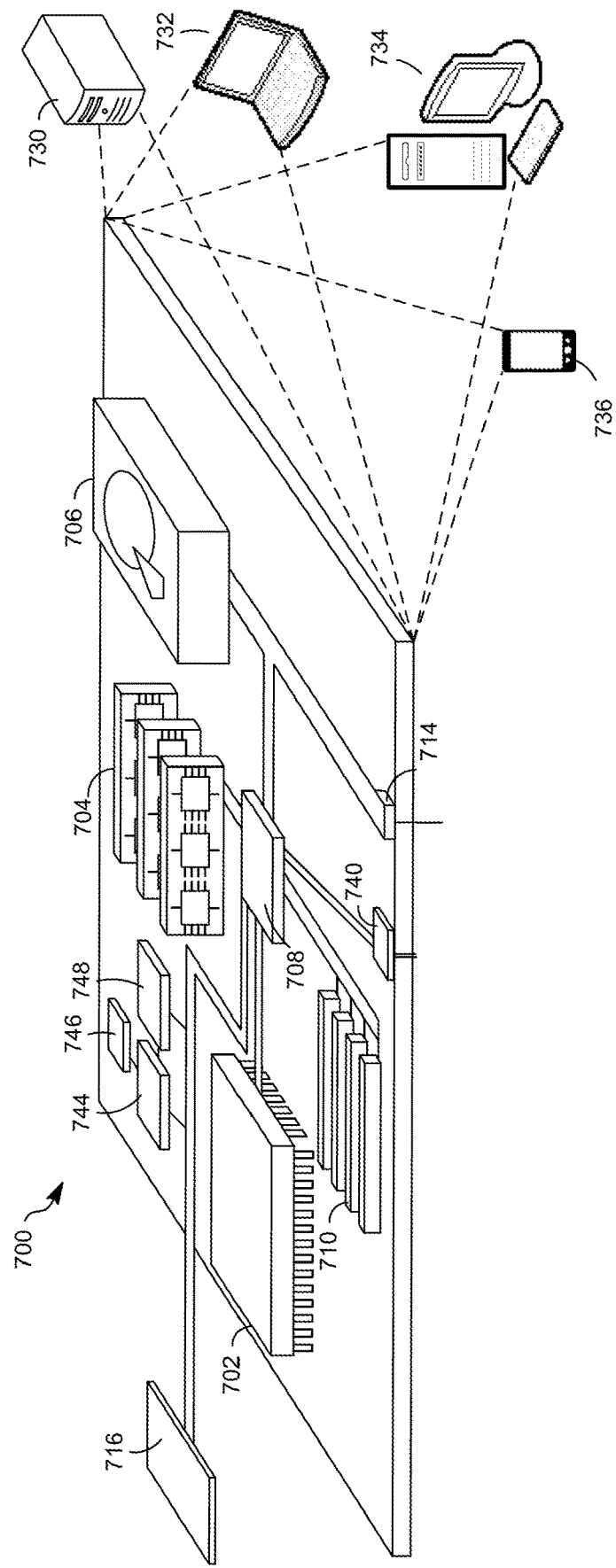
FIG. 7 shows an example of a computer device that can be used to implement the described techniques.
Figure 8:
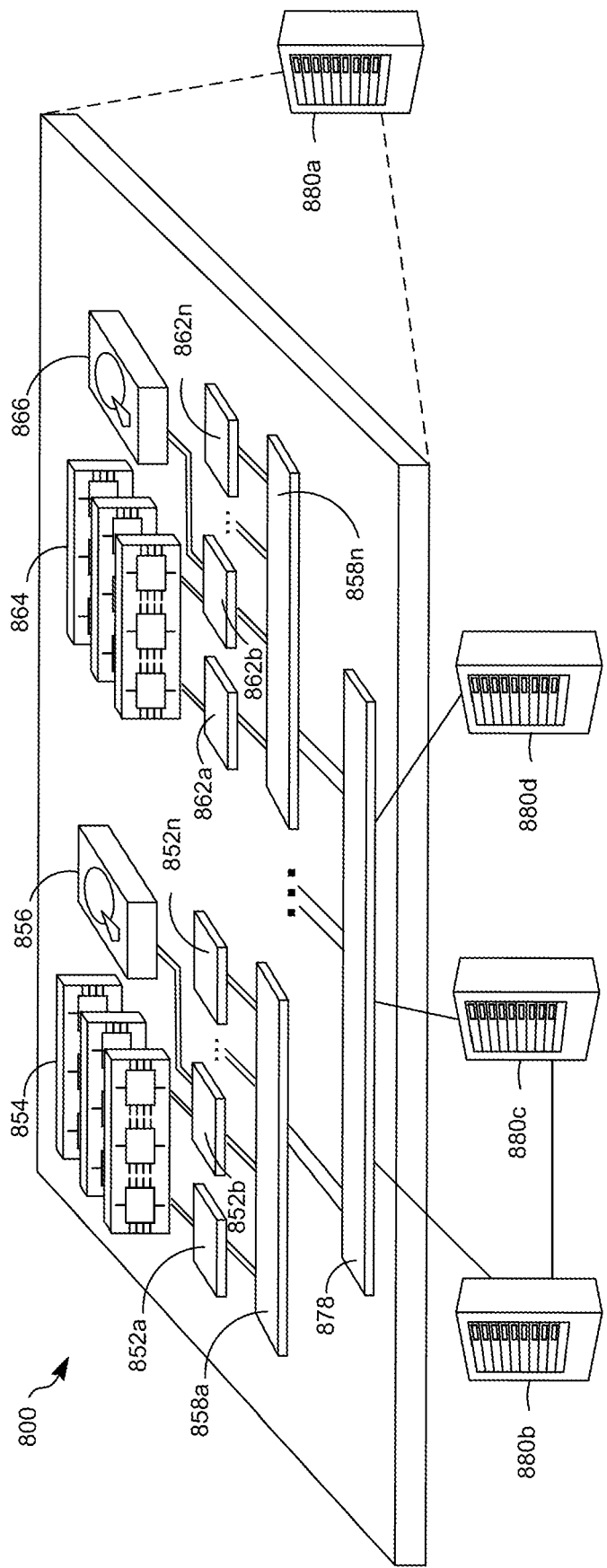
FIG. 8 shows an example of a distributed computer device that can be used to implement the described techniques.

The action suggestion system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 700, as depicted in FIG. 7, or system 800, as depicted in FIG. 8. Server 110 may include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110.

The modules of the action suggestion system 100 may include an action suggestion module 120. The action suggestion module 120 may be configured to generate training examples for training the action suggestion model 130 based on a mapping 132 of whitelisted websites to mobile applications. The whitelisted websites may be websites that are useful for performing actions. In other words, the websites may be websites that include a search interface and provide content in response to a query. Non-exhaustive examples of such websites include shopping sites, wikis, reservation sites, rating sites, travel sites, ticket sites, etc. In some implementations, the whitelist and the mapping of whitelisted websites is curated by hand and provided to the action suggestion module 120. In some implementations, the type of intent (e.g., search, share, etc.) may be included in the mapping 132. In some implementations, the action suggestion module 120 (or another module) may generate the whitelist and the mapping 132. For example, the action suggestion module 120 may search mobile application manifests 136 to determine websites mentioned in the manifest. Such manifests 136 conventionally include information about an application, such as the developer, an icon, a description, a version, etc. Some of this information may be used to help users decide whether to install the application. Some of the information may be intended for other application developers, such as application programming interfaces (APIs), and intents supported by the mobile application. Some mobile applications may include nonstandard intents and these intents may be identified in the manifest file 136. The manifests 136 may thus contain various kinds of data about the mobile application, and sometimes a manifest includes a reference to a website that offers functionality similar to that of the mobile application. Such websites are sometimes referred to as web mirrors. The manifests 136 may be submitted by the mobile application developer to a web store. The action suggestion module 120 may consider any website mentioned in the mobile application manifests 136 a whitelisted website and may map the website to the mobile application, e.g., by adding the website and mobile application to the website-mobile application map 132. If a mobile application supports more than one intent, the action suggestion module 120 may add multiple records mapping the web site to the mobile application, each one having a different intent.

In some implementations, the action suggestion module 120 (or another module) may generate entries in the website-mobile application map 132 using an emulator 122. The emulator 122 may be configured to emulate a client device in a batch environment. In other words, the emulator 122 may be configured to execute a mobile application and determine screen content generated by the mobile application. In some implementations, the emulator 122 may send an intent with a query to a mobile application and determine whether the mobile application returns content, or in other words returns results for the query. In some implementations, the content may be information in a frame buffer. In some implementations, the content may be information used by the operating system to generate a frame buffer. When the mobile application does return content, the emulator 122 may find an equivalent website, e.g., one that returns the same or similar results for the query. When the emulator 122 finds an equivalent website the emulator 122 may add the website and the mobile application and intent to the website-mobile application map 132.

The action suggestion module 120 may use the website-mobile application map 132 and search records 134 to generate positive training examples for training the action suggestion model 130. For example, the action suggestion module 120 may examine search records 134 for queries that have one of the whitelisted websites (e.g., a website in the website-mobile application map 132) as a highly ranked search result. The search records 134 may include search logs, aggregated data gathered from queries, or any other data based on queries. In some implementations, the search records 134 may be generated by a search engine in the normal process of generating search results. Highly ranked websites may be websites that are on an initial page of search results or that were often selected by the query requestors. If a query in the search records includes a whitelisted website as a highly ranked search result, the action suggestion module 120 may use the query and the mobile application that is mapped to the website, e.g., in website-mobile application map 132, as a positive training example. In other words, the action suggestion module 120 may include a training example that teaches the action suggestion model 130 that given the query, the mobile application is a good candidate for handling the query. The action suggestion module 120 may generate numerous training examples using the search records 134.

In some implementations, the action suggestion model 130 may increase the quantity of examples by clustering similar mobile applications. For example, the action suggestion module 120 may cluster mobile applications, e.g., based on data available at a web store or in the mobile application manifests 136, and may use the clusters to create additional training examples. In some implementations, mobile applications in a cluster may be considered a type of mobile application and the website-mobile application map 132 may map the website to the cluster, e.g., the type of mobile application, so that any mobile application in the cluster maps to the website. In some implementations, the action suggestion module 120 may use the emulator 122 to verify whether the mobile applications in a cluster produce similar results for a given query. If a particular mobile application in the cluster does not provide similar results to the other mobile applications in the cluster, that particular mobile application may be removed from the cluster and used as a negative training example. Accordingly, the action suggestion model 130 may be trained to exclude certain applications. Similarly, the action suggestion module 120 may use information in the search records 134 and mobile application manifests 136 to generate other negative training examples. For example, if a particular query lacks a web mirror for a mobile application, i.e., the action suggestion module 120 is unable to make a good match between highly ranked web pages for the query and a corresponding mobile application, the query may be used as a negative example for one or more mobile applications.

The action suggestion model 130 may be any type of machine-learning algorithm, such as a long short-term memory (LSTM) neural network, feed-forward neural network, a support vector machine (SVM) classifier etc., that can predict one or more actions (e.g., mobile applications) given a query. In some implementations, the action suggestion module 120 may train the action suggestion model 130 to accept the query character by character and the model 130 may make a prediction only when the endo of input character is encountered. In such implementations, the model 130 uses a very small vocabulary making it compact and suitable for storage and execution on a mobile device. In some implementations, the model 130 may include a character embedding layer, two LSTM layers with 64 nodes each, and a softmax classification layer. In some implementations, the model 130 may be trained to take words as input instead of characters.

The system may push the action suggestion model 130 to one or more client devices, e.g., client device 150 and client device 190. Client device 150 may be any mobile personal computing device, such as a smartphone or other handheld computing device, a tablet, a wearable computing device, etc., that operates in a closed mobile environment rather than a conventional open web-based environment. Client device may also be any personal computing device. Client device 150 may be an example of computer device 700, as depicted in FIG. 7. Client device 150 may be one mobile device used by user 180. User 180 may also have other mobile devices, such as client device 190.

Client device 150 may include one or more processors formed in a substrate configured to execute one or more machine executable instructions or pieces of software, firmware, or a combination thereof. The client device 150 may thus include one or more computer memories configured to store one or more pieces of data, either temporarily, permanently, semi-permanently, or a combination thereof. The client device 150 may thus include applications 155, which represent machine executable instructions in the form of software, firmware, or a combination thereof. The components identified in the applications 155 may be part of the operating system. In some implementations the applications 155 may be mobile applications developed for a mobile processing environment. Conventionally, mobile applications operate in a closed environment, meaning that the user employs separate applications to perform activities usually performed in a web-based browser environment. For example, rather than going to bookit.com to book a hotel, a user of the client device 150 can use a mobile application in mobile applications 155 provided by bookit.com. As previously discussed, a mobile application may have web pages that mirror the mobile application, e.g., providing the same or similar content as the mobile application. Thus, in some implementations, the web page(s) (e.g., at bookit.com) may be considered a web mirror of the mobile application (e.g., an app provided by or associated with bookit.com).

The applications 155 may include a screen capture application 160 and an action suggestion application 162. In some implementations, one or more of these applications can be provided by the operating system of the client device 150. In some implementations, one or more of these applications can be downloaded and installed by the user.

The screen capture application 160 can include various functionalities. In some implementations, the screen capture application 160 may be configured to get textual information represented on the screen from an application program interface (API). In some implementations, the screen capture application 160 may be built into the operating system, which can determine the content of text fields displayed on the current screen. In some implementations, the screen capture application 160 may be configured to capture the current screen of the client device 150. The screen capture application 160 may capture the screen by copying or reading the contents of the device's frame buffer. The captured screen may, thus, be an image and is referred to as a captured image. The screen capture application 160 may capture the screen at intervals. The interval can be small, for example every half second or every second. In some implementations, the screen capture application 160 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen capture application 160 may increase the interval at which a screen capture occurs when the screen does not change. In other words, when the screen is static, the screen capture application 160 may capture images less often. The screen capture application 160 may provide the captured screen images and metadata to a recognition engine, which may be on the client device 150 or a server, such as server 110. The metadata may include the timestamp, the mobile device type, a mobile device identifier, the mobile application running when the screen was captured, e.g., the application that generated the screen, etc. In some implementations, the metadata may also include which applications are active, the location of the device, ambient light, motion of the device, etc. The system may use this additional device information to assist in content analysis (e.g., disambiguation), suggested action generation (e.g., reducing the quantity of suggestions when the device is moving, deciding what content is most relevant), etc.

In some implementations, the screen capture application 160 can include an indexing engine configured to index a screen capture image according to the text, entities, images, logos, etc. identified in the image. Thus, for example, the indexing engine may generate index entries for a captured image. In some implementations the indexing engine may be on a server, such as server 110, and the screen capture application 160 may provide the captured image and/or recognized items in the captured image to the server. The index may be an inverted index, where a key value (e.g., word, phrase, entity, image, logo, etc.) is associated with a list of images that include the key value or from which the key value was recognized. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 172. Of course, in some implementations the system may store the index in a user account on a server in addition to or instead of on the client device 150. The user of the client device 150 may control when the screen capture application 160 is active. For example, the user may specify that the screen capture application 160 is active only when other specified mobile applications 155 are running (e.g., only when in a social media mobile application). The user may also manually turn the screen capture application 160 on and off, for example via a settings application. In some implementations, the user may invoke the screen capture application 160 with a gesture or action that also invokes the action suggestion application 162.

The client device 150 may also include an action suggestion application 162. The action suggestion application 162 may be configured to use action suggestion model 170 or action suggestion model 130 to determine a query from a selection provided by the user and to provide suggested actions for the query. In some implementations, the user 180 may specifically invoke or initiate the action suggestion application 162 using an action suggestion indication. In some implementations, the action suggestion indication may also invoke the screen capture application 160. In some implementations, the gesture/action, i.e., the action suggestion indication, may be a long press, a two finger click, or selection from a menu (e.g., a menu that appears after a swipe up or swipe down) that initiates a user interface control that enables the user 180 to actively select a portion of the screen. In some implementations, the action suggestion indication may be dragging a selection control to the portion of the screen to be selected. In some implementations, the action suggestion indication may be implicit, e.g., by the user executing a user interface specific to the action suggestion application 162. For example, the user may open the user interface and may type in or speak the selection. If the user 180 selects a portion of the screen with an image, e.g., via the long press over an icon or picture, the action suggestion application 162 may be configured to determine text associated with the image and use the text as the selection. In some implementations, the screen capture application 160 may perform recognition on the selected area and provide the text to the action suggestion application 162. The action suggestion application 162 may use the selection, e.g., text currently displayed on the screen, text typed or spoken into a user interface, or text associated with a selected image, as a query for the action suggestion model.

In some implementations, the action suggestion application 162 may offer rewritten queries in response to the selection. For example, the action suggestion application 162 may determine common query completions or related queries, e.g., from action suggestion model 170, action suggestion model 130, or from another module, for the current query, or in other words for the query determined from the selection. In some implementations, the action suggestion application 162 may offer query completions in addition to suggested actions for the current query. If the user selects one of the rewritten queries, the action suggestion application 162 may use the selected rewritten query as the current query and offer new suggested actions for the rewritten query, as explained in more detail below with regard to FIGS. 6A and 6B.

The action suggestion application 162 may use an action suggestion model, such as action suggestion model 170 or action suggestion model 130, to determine suggested actions for the query. In some implementations, the action suggestion model 170 may be a copy of the action suggestion model 130. In some implementations, the action suggestion model 170 may be a personalized copy of the action suggestion model 130. For example, the client device 150 may receive the action suggestion model 130 from the server 110, or an updated action suggestion model 130, and may perform further training of the model on the client device 150. For instance, the action suggestion application 162 may use user data 176, which may include queries submitted from the client device 150 or information on the use of certain mobile applications 155, to generate or re-weight positive training examples for the action suggestion model 170. These additional training examples may personalize the action suggestion model 170 so that the action suggestion application 162 offers suggested or predicted actions more relevant to the user 180. For example, if user 180 uses a first reservation mobile application often, but never uses a second reservation mobile application, the action suggestion application 162 may upweight the first reservation mobile application for the model so the action suggestion application 162 suggests the first reservation application and not the second one.

The action suggestion model 170 is configured or trained to predict one or more actions given a query. For example, the action suggestion application 162 may provide the model 170 with a query and the model 170 may provide one or more suggested actions for the query. The suggested actions are in the form of mobile applications that are configured to handle the query. The action suggestion application 162 may provide a user-interface that offers the suggested action(s) to the user of the device in a manner consistent across mobile applications. In some implementations, the suggested actions may be in the form of a selectable control. The control can be an overlay displayed on top of the screen being displayed, an underlay displayed behind the screen being displayed, or information configured to be added to the current screen in the display buffer of the mobile device. In other words, the suggested action control represents information added to a screen generated at the mobile device, whether displayed over, under, or integrated into the screen when it is displayed.

The suggested action control may be configured to detect a selection that initiates the corresponding action, e.g., in the form of initiating an intent. The suggested action thus, acts like a hyperlink in an HTML-based document. Because the action suggestion system 100 can provide the suggested action control for any mobile application running on the mobile device, actions are consistent across mobile applications.

Although illustrated as executing on the client device 150, in some implementations, the action suggestion application 162 may be a module executing on a server, such as server 110. In such implementations, the screen capture application 160 may provide the selection, e.g., selected text, image, etc., to the action suggestion application 162 at the server and the action suggestion application 162 may provide the screen capture application 160 with the corresponding action(s) using the action suggestion model 130. In some implementations, the screen capture application 160 may use the corresponding action(s) to provide the interface that integrates the suggested action with the selection on the screen and makes the action selectable. In some implementations, the action suggestion application 162 may associate the suggested action control with screen coordinates that correspond to a location of the selection in a captured image. The coordinates may be selected to be near but not completely obscuring the selection.

In some implementations, the screen capture application 160 may integrate the suggested action controls with a current screen. For example, if the screen capture application 160 receives the selected actions from the action suggestion application 162, the screen capture application 160 may combine the selected action controls with the current display. In some implementations, the screen capture application 160 may generate an overlay, as an underlay, or may interleave the suggested action controls with the current screen in the display buffer. In some implementations, the screen capture application 160 may be configured to verify that the currently displayed screen is similar enough to the captured screen image before displaying the suggested action controls. For example, the screen capture application 160 may use the coordinates for the control or for the corresponding selection to determine a visual cue from the captured image and compare the visual cue with the same coordinates for the currently displayed image. In some implementations, the screen capture application 160 may be configured to look a short distance for visual elements in the current image that are similar to those for the visual cue. If found, the screen capture application 160 may adjust the coordinates of the suggested action controls to match the movement of the underlying screen. In some implementations, the screen capture application 160 may initiate an activity or mode that displays the captured image, the selected text or image, and the actions on top of the current screen. The previously captured image, selected text or image, and actions may be displayed until the user selects the action or cancels the display (e.g., with a cancel or 'go-back' command).

In some implementations, the action suggestion application 162 may use a ranking engine to determine which suggested actions from the model to display. For example, the action suggestion application 162 may choose a quantity (e.g., 3 or 4) of the top ranking, or in other words most probable, actions, or any action with a probability score higher than a specified threshold, or a combination of these. In some implementations, the quantity or threshold may be dependent on metadata about the device, e.g., a lower quantity or higher threshold when the device is moving. In some implementations, the display of the suggested actions may be scrollable, e.g., to allow the user to select from more actions than are initially displayed.

The client device 150 may include data stores 157, which are stored in the memory of the client device 150 and used by the applications 155. In some implementations, the data stores 157 may include the action suggestion model 170, the screen capture index 172, and the user data 176. One or more of these data stores may be associated with a user account or profile. Thus, the data stores may also reside on server 110. In addition, one or more of the data stores 157 may be copies of or subsets of data stored on the server 110 or in another location specified by the user. The data stores 157 may be stored on any non-transitory memory.

The client device 150 may be in communication with the server 110 and with other client devices 190 over network 140. Network 140 may be for example, the Internet, or the network 140 can be a wired or wireless local area network (LAN), wide area network (WAN), etc., implemented using, for example, gateway devices, bridges, switches, and/or so forth. Network 140 may also represent a cellular communications network. Via the network 140, the server 110 may communicate with and transmit data to/from client devices 150 and 190, and client device 150 may communicate with other client devices 190 (not shown).

The action suggestion system 100 represents one example configuration and implementations may incorporate other configurations. For example, some implementations may combine one or more of the components of the emulator 122, the action suggestion module 120, or the action suggestion application 162 into a single module or engine. Similarly, some implementations may combine one or more of the screen capture application 160 and the action suggestion application 162 into a single module or application. Furthermore, one or more of the components of the action suggestion application 162 or the screen capture application 160 may be performed at the server 110, while one or more of the components of the emulator 122 or the action suggestion module 120 may be performed at the client device 150. As another example one or more of the data stores, such as the mobile application manifests 136, the search records 134, the action suggestion model 130, or website-mobile application map 132 may be combined into a single data store or may be distributed across multiple computing devices, or may be stored at the client device 150. Likewise, one or more of the screen capture index 172 and the user data 176 may be stored at the server 110 or another location specified by the user.

To the extent that the action suggestion system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to receive content that may be more relevant to the user. In addition, certain data may be treated in one or more ways before it is stored or used, so that personally identifiable information is removed. For example, search records may be treated so that no personally identifiable information can be determined and/or a user's geographic location may be generalized where location information is obtained (such as to a city, ZIP code, or state level), so that a particular location of a user cannot be determined. Thus, the user may have control over how information is collected about the user and used by a action suggestion system 100.

Figure 2B:
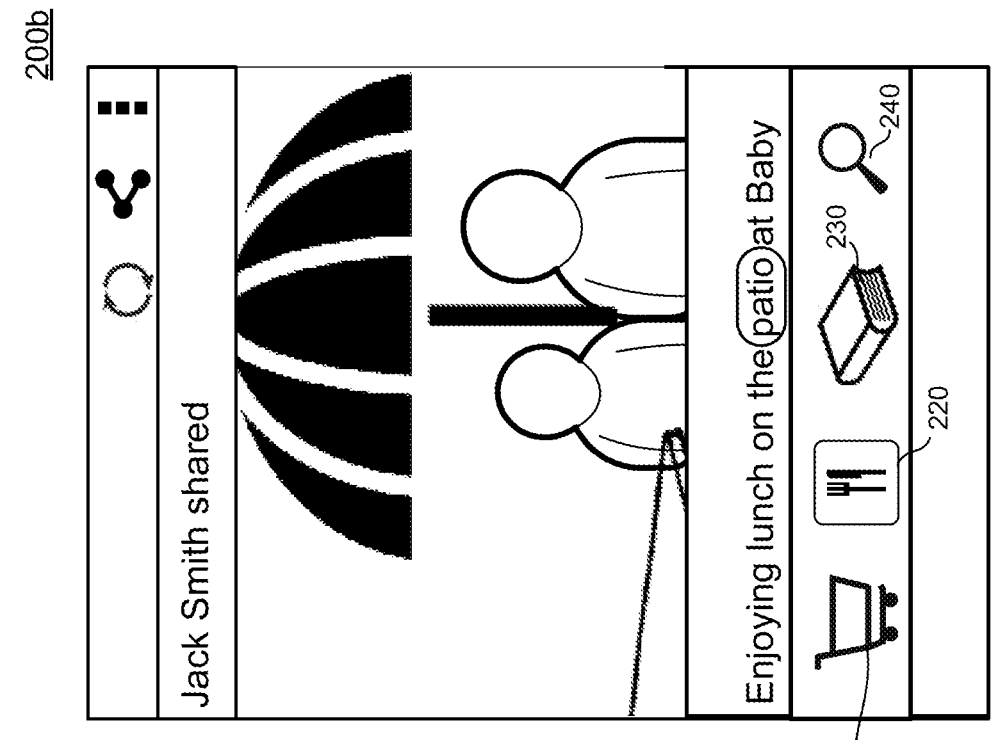
FIGS. 2A and 2B are example displays of a mobile computing device in accordance with the disclosed subject matter.
Figure 2A:
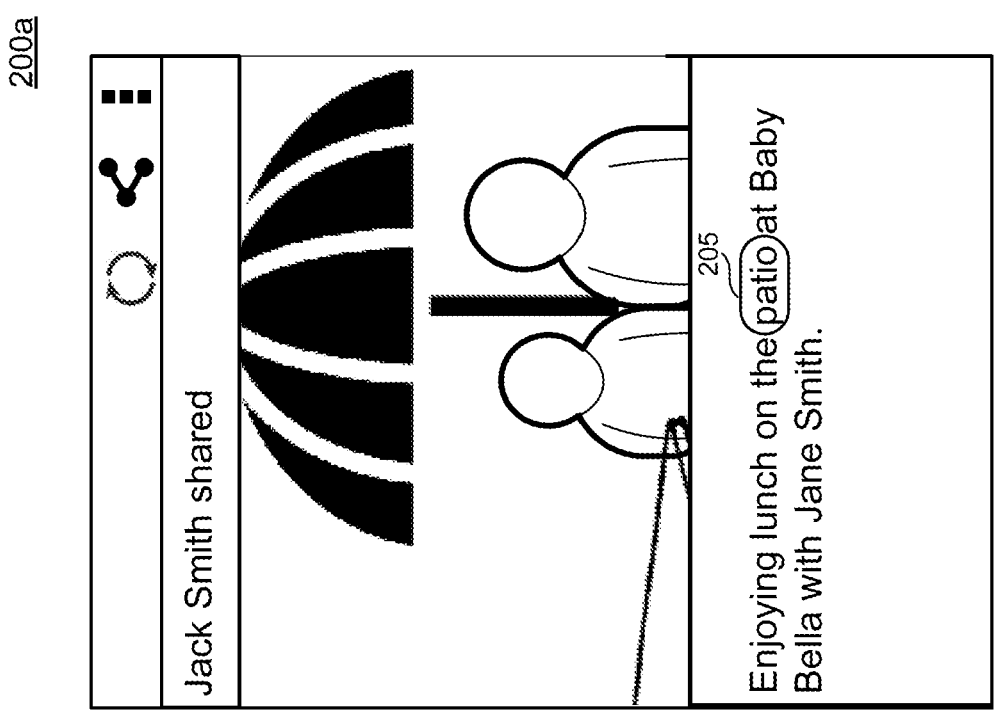

FIGS. 2A and 2B are example displays 200a and 200b of a client computing device in accordance with the disclosed subject matter. The display may be a display of a mobile device, such as client device 150 of FIG. 1. In FIG. 2A the user has made a selection 205 of content displayed on the screen 200a. The selection 205 is of the text "patio" displayed on the screen by the source program. The selection 205 may be visually marked so that it differs in some aspect from surrounding content. For example the selection 205 may be highlighted, may have a font color change, may have a shape surrounding it, etc. The action suggestion application 162 may use the selected text as a query and send the query patio to the action suggestion model 170. The action suggestion model 170 may provide one or more suggested actions in response to the query. FIG. 2B illustrates an example of some of the suggested actions. For example, action 210 may be an icon that represents a shopping mobile application or an online marketplace mobile application. If the user selects action 210, the action suggestion application 162 may activate the shopping mobile application (e.g., switch focus to the shopping mobile application or in other words the destination application) with a search intent. A search intent is an operating system standard that opens the application in a search state, or in other words a search user interface. Search intents can work with mobile applications and web applications. The search intent may support a query parameter, so that the mobile application is provided with the query as part of the search intent and opens or activates to a search result page or user interface. Implementations may also use other intents, either standard (i.e., supported by the operating system) or nonstandard (i.e., supported by the mobile application but not by the operating system), that can take the query as a parameter. Thus, selection of action 210 may pass the query patio to the shopping mobile application, cause the client device to open or switch focus to the shopping mobile application, and shopping mobile application may display a result page for the query. In this manner the action suggestion application 162 reduces the input needed to perform the search and switch context, improving the user experience.

Action 220 may represent a restaurant reservation mobile application. Like the shopping mobile application, the restaurant reservation mobile application may also include a search intent and, should the user select action 220, the reservation mobile application may open with a search result interface responsive to the query patio. Action 230 may be a dictionary mobile application, e.g., that provides the definition of a word. Selection of action 230 may switch context to the dictionary mobile application in an interface with search results for the query patio. Action 240 may represent a search engine, e.g., a search engine local to the client device 150 or an Internet search engine. Selection of the action 240 may switch context to the search engine to a search result page for the query patio. Of course the actions illustrated in FIG. 2B are examples only and other suggested actions may be presented to the user. The presentation of the actions in FIG. 2B is illustrated in a bar that overlays part of the screen content generated by the source application. Implementations may include other arrangements, such as a carousel display, a circular display, a menu display, etc. of the actions.

FIGS. 3A and 3B are example displays of a mobile computing device in accordance with the disclosed subject matter. An action suggestion system, such as system 100 of FIG. 1 may provide the user interface 300 of FIGS. 3A and 3B for a user to enter a specific selection, e.g., by entering query 305. The query 305 may be typed or spoken. Thus, rather than the selection being content generated for display by a source application, the user interface 300 may be generated by the action suggestion application itself and enable the user to provide the selection directly to the action suggestion application. Such a user interface 300 may be considered a launcher for the action suggestion application. The system may use the query 305 as input into an action suggestion model, e.g., such as action suggestion model 170 of FIG. 1. The model may provide suggested actions to the query. In the example of FIG. 3B, the model may suggest a reservation action 310, a travel action 320, a help action 330, and an airline action 340. Each action may be associated with a selectable control, as described above. The selectable control may be an icon associated with the mobile application associated with the action. Thus, the reservation action 310 may be associated with an icon for a reservation mobile application and selection of action 310, or in other words of the control for action 310, may launch the reservation application with a search intent. The search intent may have the query 305 as a parameter. Accordingly, the client device may launch the reservation application 310 to a research result screen with results responsive to the query 305. The user interface 300 thus enables a user to provide a specific query and to be provided with actions appropriate for the query.

In some implementations, the user may not have one of the mobile applications installed. For example, the user may not have the travel application that corresponds to the travel action 320 installed. Selection of the control for action 320 may cause the device to initiate a download process for the application. Thus, the user interface 300 may provide the user with actions, or in other words mobile applications, that others consider helpful even if the user does not know about the mobile applications. In some implementations, if the user does not have the travel application installed the system may convert the action to a search intent for an Internet search mobile application, a dictionary app a wiki app, etc. The user interfaces illustrated in FIGS. 2A, 2B, 3A, and 3B work on any selection, not just selections tied to an entity in a knowledge base or that fits a template for an entity type. Thus, the user interfaces of these figures greatly expand the selections that have associated actions. Moreover, while action controls are illustrated as icon-based, action controls could be text based or a combination of text and images. Thus, the action controls are understood to include text based, image based, or a combination of text and image controls.

Figure 4:
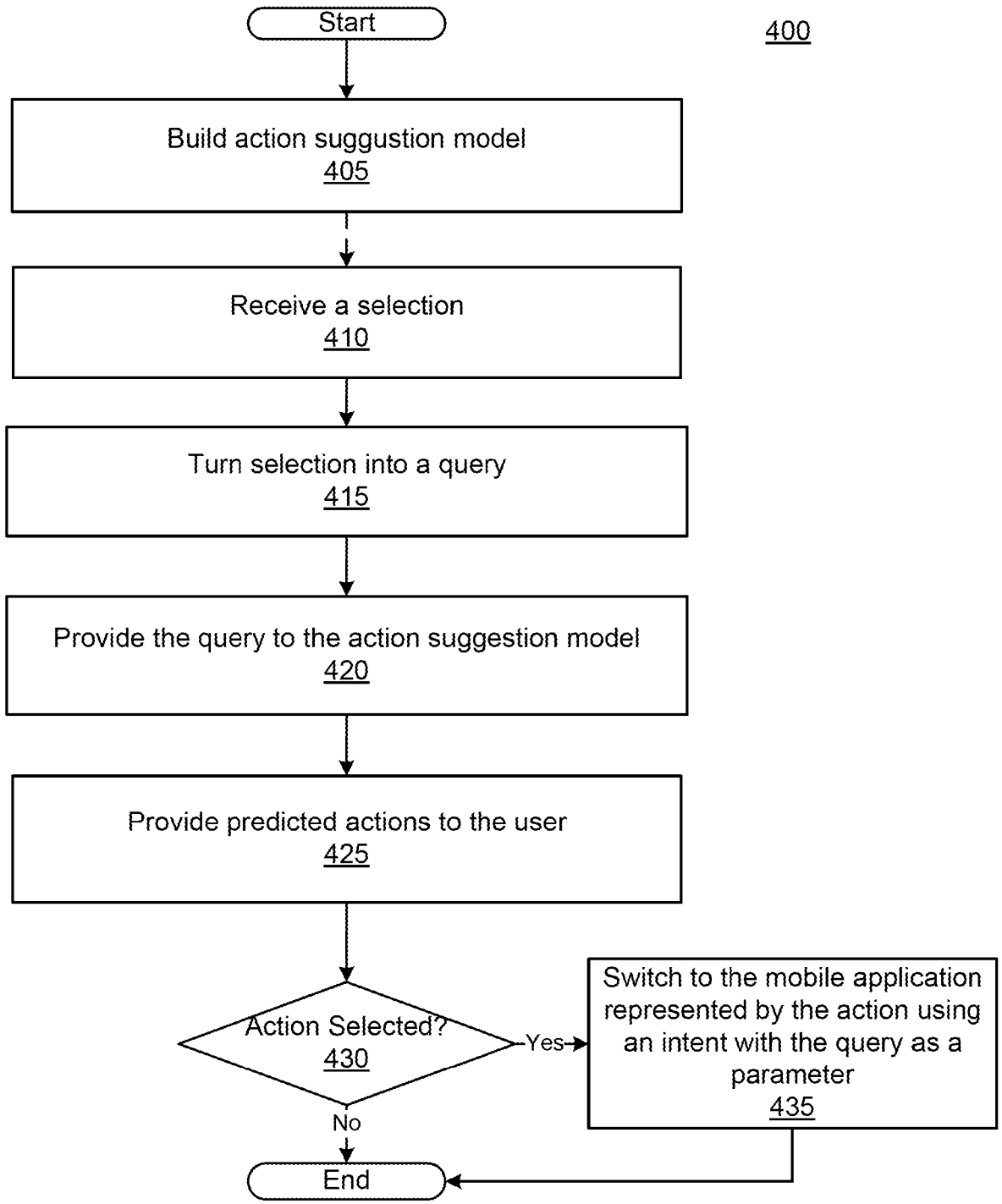
FIG. 4 illustrates a flow diagram of an example process for suggesting actions for a text selection based on content displayed on a mobile computing device, in accordance with disclosed implementations.
Figure 5:
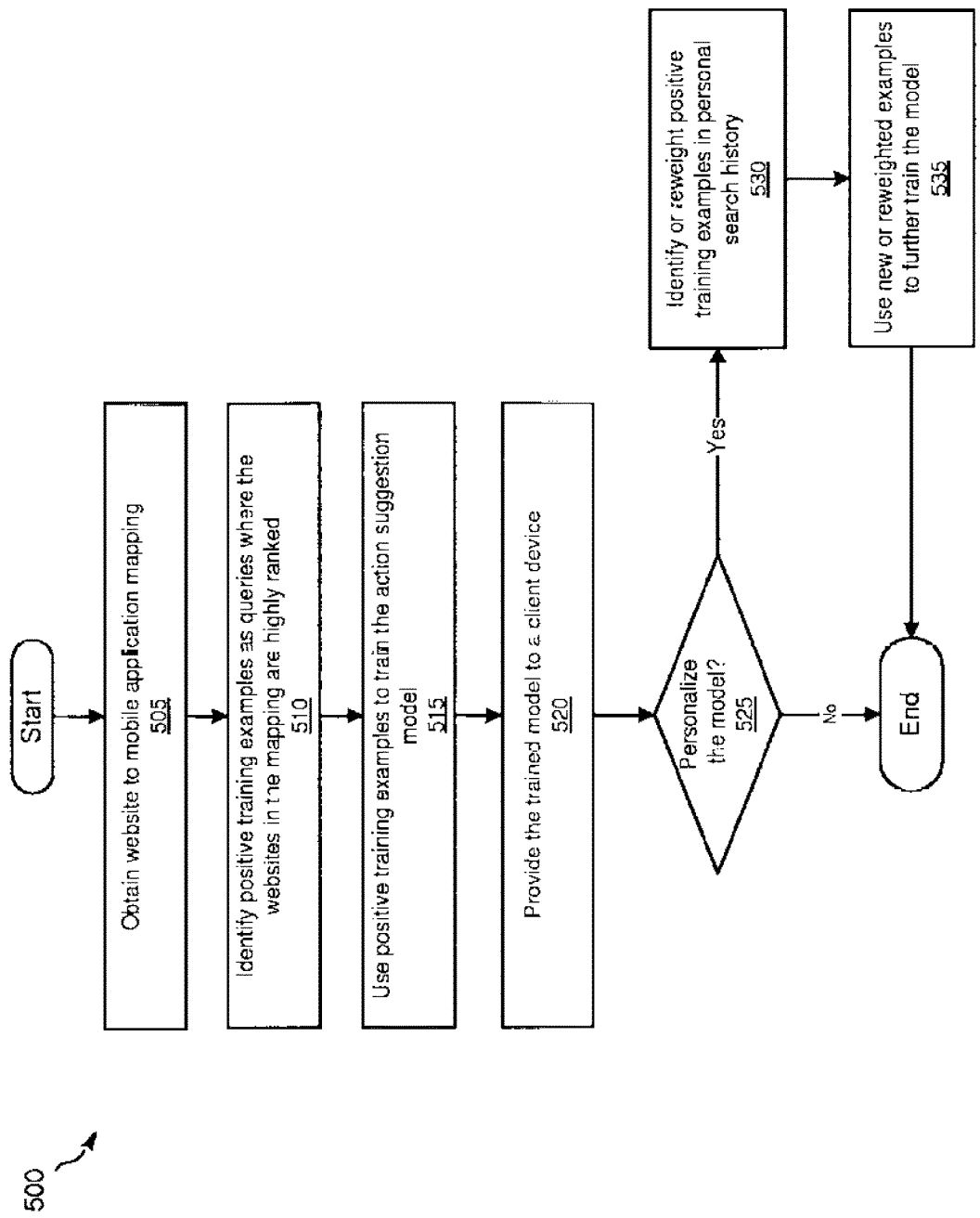
FIG. 5 illustrates a flow diagram of an example process for generating an action suggestion model, in accordance with disclosed implementations.

FIG. 4 illustrates a flow diagram of an example process 400 for suggesting actions for a text selection based on content displayed on a mobile computing device, in accordance with disclosed implementations. Process 400 may be performed by an action suggestion system, such as system 100 of FIG. 1. Process 400 may be used to determine suggested actions for a query, the query being identified from a screen capture image or from an action suggestion launching user interface. Process 400 may begin by generating an action suggestion model (405). The action suggestion model may provide suggested actions, i.e., mobile applications with an intent that uses the a given query. The query may be based on a selection made by the user of the mobile computing device. The intent can be one of any standard or nonstandard intents. FIG. 5 illustrates one example of building an action suggestion model. Although not specifically illustrated in FIG. 4, the system may build the model on a server and push the model to a client device.

The system may receive a selection (410) subsequent to receiving an action suggestion indication. The selection may be in the form of a query directly entered into an action suggestion user interface. The selection may also be in the form of text or an image selected from content displayed on the screen of a client device. For example, the user may provide an action suggestion indication that indicates the intent to select on-screen content. The system may provide the user with the ability to select text, an image, or a combination of text and images from among on-screen elements. The action suggestion indication may be, for example, a long press, a two finger press, or the user may drag a selector tool over the area of the screen to be selected. In some implementations, the user may be have the opportunity to change the boundaries of the selection, e.g., to add additional words or to narrow the selection. In some implementations, the selection may also be a query extension. For example, the user may select text and the system may offer common extensions as suggestions for modifying the query (e.g., the selection). If the user selects one of the query extensions, the query extension becomes the selection.

The system may then turn the selection into a query (415). If the user selects text on the screen or types in a query, the system may turn the selection directly into a query. Thus, in the example of FIG. 2A, the selected text patio is used as the query. If the user selects an image, the system may determine text associated with the image and use the text as the selection. For example, some images include an image tag that includes a text description of the image. Such tags may not be visible on-screen but can be used by software to help the visually impaired and may be used by search engines to index the images. The system may turn the selected image into a query by using the text in the image tag as the query. As another example, the image may include text that can be determined via a text recognition process. The system may turn the selected image into a query by using text recognized in the image as the query. As another example, the image may be associated with an entity in a knowledge base. The knowledge base may include a text description or title for the image. The system may use the text description or title as the query.

The system may provide the query to the action suggestion model (420). The model may be machine-learning algorithm trained to predict one or more actions given a query. In some implementations, the system provides the query one character at a time to the model to reduce the vocabulary of the model. The model may provide predicted or suggested actions for the query, which the system may provide to the user (425). For example, the system may provide a selectable control for each action that enables a user to select the action. The actions represent intents for mobile applications, such as search intents or share intents. The actions can also represent search intents for websites, for example when the client device is a laptop running a browser. The system waits for the user to select an action (430, Yes) or to end the action suggestion interface (430, No). If the user does select a suggested action (430, Yes), the system may initiate execution of the mobile application represented by the action with an intent, using the query as a parameter in the intent (435). In some implementations, the intent is a standard intent, such as a search intent or share intent. Thus, the client device switches context from whatever application was currently executing, e.g., the source application, to the mobile application represented by the selected action, e.g., the destination application. In an implementation where the client device is not a mobile device, the action may be associated with a search interface in a specific website that mirrors the mobile application, and the system may cause the browser to navigate to the search interface with a search intent using the query as a parameter. Thus, the user is able to switch automatically to the destination application (e.g., the mobile application or the web mirror of the mobile application).

In some implementations, the action may be associated with a mobile application that is not installed on the mobile device. When this occurs, the action for the selected entity may be a secondary action that, when selected, takes the user to an interface where the user can download and install the mobile application, or initiates installation of the mobile application automatically. Thus, it is understood that selection of the action may enable the user to install the mobile application. In some implementations, after the mobile application is successfully installed the system may automatically initiate an intent using the query as a parameter to open the newly installed mobile application. In some implementations, if the user does not have a particular mobile application installed, the system may substitute a browser-based search of the query. In some implementations, if no action is specified the system may provide default options via a user interface, such as a browser search or a cut/copy option, for handling the query.

FIG. 5 illustrates a flow diagram of an example process 500 for generating an action suggestion model, in accordance with disclosed implementations. Process 500 may be performed by an action suggestion system, such as system 100 of FIG. 1. Process 500 is an example of step 405 of FIG. 4 and may be used to build an action suggestion action model, such as model 130 or model 170 of FIG. 1. Process 500 may begin by obtaining a website to mobile application mapping (505). In some implementations, the mapping may be provided, e.g., curated by hand. In some implementations, the system may build the mapping. For example, the system may use mobile application manifests to determine a website mirror for a mobile application. In some implementations, the system may augment the mapping by clustering similar mobile applications together and mapping all similar applications to a website mirror. For example, there may be several reservation mobile applications, e.g., for booking a flight, rental car, hotel, etc. and these may be clustered together using conventional clustering algorithms. In some implementations, the system may map each application in a cluster to a website mirror. In some implementations, the system may use an emulator to determine which mobile applications a website maps to. For example, the emulator may be configured to obtain a query from search records and to simulate execution of various mobile applications (e.g., those available via a web store). The emulator may determine whether a particular mobile application returns results similar to those of the website given the same query. If so, the emulator may map the website to the mobile application. In some implementations, the emulator may be configured to provide a query to a mobile application and determine whether the mobile application ends up in a content state, or in other words returns valid search results for the query. If so, the system may find a website mirror, e.g., one that returns similar results given the same query. In any of these manners the system may build the website to mobile application mapping.

The system may identify positive training examples for training the model (510). The positive training examples may be extracted from search records. The search records may be an anonymized record of queries submitted by users of an Internet search engine. The system may select highly-ranked results for queries in the search records. A result may be considered highly ranked when it has a high relevance to the query or when the result has a high click-through rate, e.g., is often selected for further viewing by the query requestor. Highly ranked websites are considered positive examples for the query and therefore the mobile applications mapped to the highly ranked websites represent likely actions for the query. In some implementations, the positive training example may have a weight equal to the relevance of the website to the query in the search records. In some implementations the positive training example may have a weight proportional to the click-through rate. In some implementations, the system may also generate negative examples. For example, a mobile application that does not map to a website that is highly ranked for a query may be a negative example. Similarly, when a highly ranked search result has no corresponding mobile application (e.g., no mapping), any mobile application may be used as a negative example for that query.

The system may use the positive training examples and the negative ones to train the action suggestion model (515). The system may provide the trained model to a client device (520). In some implementations, the model may be pushed to client devices when an action suggestion application installed or the model is updated. In some implementations, the action suggestion application may pull the model from the server, e.g., as part of an application update. At the client device, the system may determine whether to personalize the model (525). If no personalization is done (525, No), process 500 ends. Otherwise (525, Yes), the system may identify positive training examples from search records associated with the client device or with the user of the client device (530). For example, the system may use search records associated with a user profile to add additional positive training examples as described above. In addition or alternatively, the search records associated with the client device and/or the user may be used to reweight training examples. The system may use the updated examples to further train the model (535). Thus, the model may be trained to predict actions most relevant to the user. Process 500 then ends.

Figure 6B:
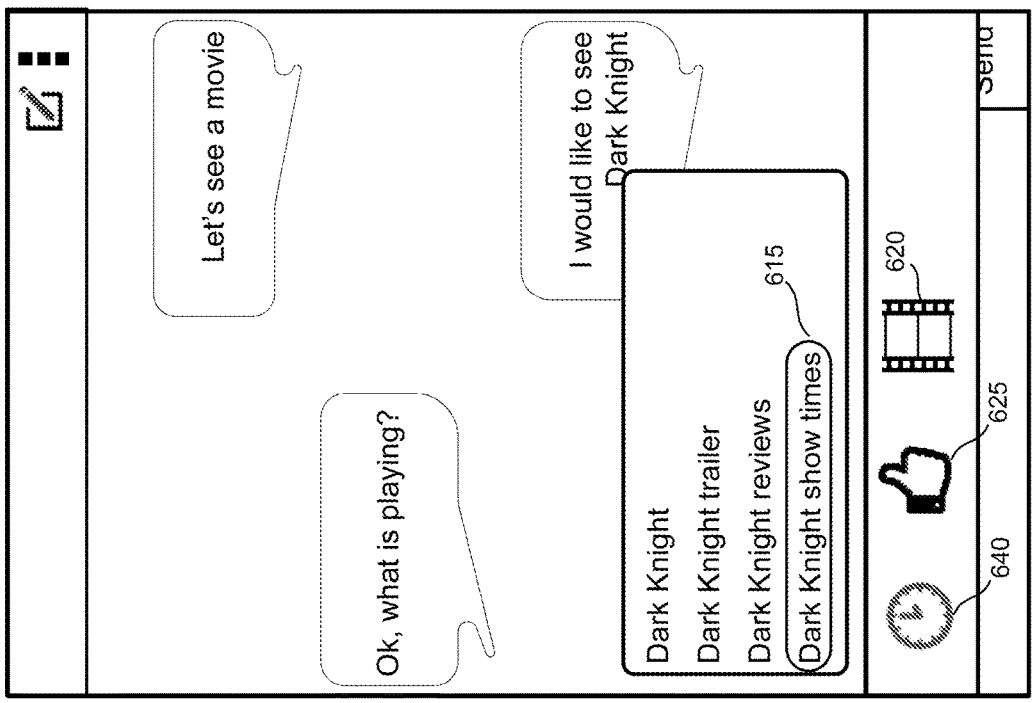
FIGS. 6A and 6B are example displays of a mobile computing device with selection enhancements, in accordance with disclosed implementations.
Figure 6A:
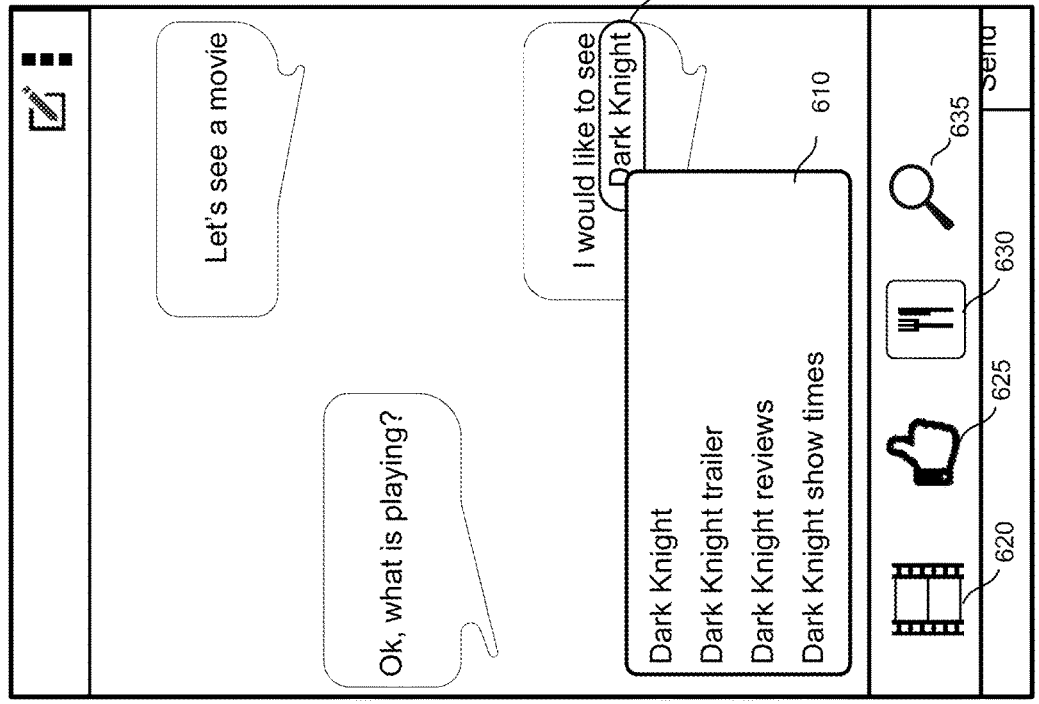

FIGS. 6A and 6B are example displays of a mobile computing device with selection enhancements, in accordance with disclosed implementations. An action suggestion system, such as system 100 of FIG. 1 may provide the user interface 600 of FIGS. 6A and 6B to offer query enhancements. In the example of FIG. 6A, a user has made selection 605, selecting the text "Dark Knight." The system has provided four suggested actions for the selection 605, namely a movie database action 620, a movie review action 625, a dining reservation action 630, and a search action 635. In addition to the suggested actions 620 to 635, the system has also provided query extensions 610. Query extensions 610 may represent queries that are similar to or include the query of selection 605 that others have searched for. The system may obtain the query extensions 610 from the action suggestion model, from search records, or from a query extension module, which may run on a server or the client device. The query extension module may have access to common queries extensions determined from search records. In the example of FIG. 6A, the query extensions for the "Dark Knight" query are Dark Knight trailer", "Dark Knight reviews" and "Dark Knight show times". In the example of FIG. 6B, the user has selected "Dark Knight show times", which becomes the current selection 615 and is converted into the query dark knight show times. The system may provide this query to the action suggestion model, which may use the refined query to re-rank the actions. In some implementations, the model may provide a new set of suggested actions, such as suggested actions 640, 625, and 620, as illustrated in FIG. 6B. The action 640 may be for a mobile application that provides local movie times. Actions 625 and 620 are the same as those discussed with regard to FIG. 6A, but the order has changed, putting movie review action 625 ahead of movie database action 620. Thus, FIGS. 6A and 6B illustrate a user interface that suggests query extensions for a selection and how the query extensions may have differently ranked actions and/or different suggested actions than the original query.

It is noted here, yet also applicable to various of the embodiments described herein, that capabilities may be provided to determine whether provision of actions is consistent with rights of use of content, layout, functionality or other aspects of the image being displayed on the device screen, and set capabilities accordingly. For example, settings may be provided that limit content or selection where doing so could be in contravention of terms of service, content license, or other limitations on use. Such settings may be manually or automatically made, such as by a user when establishing a new service or device use permissions, or by an app installation routine or the like.

FIG. 7 shows an example of a generic computer device 700, which may be operated as server 110, and/or client 150 of FIG. 1, which may be used with the techniques described here. Computing device 700 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a computing device, such as a laptop computer 732, personal computer 734, or tablet/smart phone 736. An entire system may be made up of multiple computing devices 700 communicating with each other. Other configurations are possible.

FIG. 8 shows an example of a generic computer device 800, which may be server 110 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 880.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 880 may include other components not shown, such as controllers, buses, input/output devices, communications modules, etc.

An entire system, such as system 100, may be made up of multiple computing devices 880 communicating with each other. For example, device 880a may communicate with devices 880b, 880c, and 880d, and these may collectively be known as system 100. As another example, system 100 of FIG. 1 may include one or more computing devices 880. Some of the computing devices may be located geographically close to each other, and others may be located geographically distant. The layout of system 800 is an example only and the system may take on other layouts or configurations.

According to certain aspects of the disclosure, a mobile device includes at least one processor, a display device, and memory storing instructions that, when executed by the at least one processor, cause the mobile device to perform operations. The operations include converting a selection made via the display device into a query, providing the query to an action suggestion model, the action suggestion model being trained to predict an action given a query, each action being associated with a mobile application, receiving one or more predicted actions, and initiating display of the one or more predicted actions on the display device.

This and other aspects can include one or more of the following features. For example, the operations may also include receiving a selection of one of the one or more predicted actions and initiating an intent using the query for the mobile application associated with the selection. As another example, initiating display of the one or more predicted actions includes for each predicted action, displaying an icon for the mobile application associated with the predicted action. In some implementations, the icons for the one or more predicted actions overlay content displayed on the display device. As another example, the selection is an image and converting the selection into a query includes identifying text related to the image and using at least some of the text as the query. As another example, the selection is an image and converting the selection into a query include identifying an entity in the image and using the entity as the query.

As another example, the operations may also include receiving the action suggestion model from a server, identifying whitelisted websites in search records for a user of the mobile device, generating training examples from queries that include the whitelisted websites as highly ranked, the training examples having a weight higher than a ranking of the whitelisted website in the search records, and using the training examples to train the action suggestion model, resulting in a personalized action suggestion model. As another example, the selection may be a voice command and converting the selection into a query can include performing word recognition on the voice command and using recognized words as the query. As another example, converting the selection into a query can include determining extensions for the selection to generate at least one extended query, providing the extended query to the an action suggestion model to generate second predicted actions, initiating display of the at least one extended query, and responsive to receiving a selection of the extended query, initiating display of second predicted actions. As another example, at least one of the mobile applications may not be installed on the mobile device.

According to certain aspects of the disclosure, a method includes identifying, from search records, queries where a website is highly ranked in corresponding search results, the website being one of a plurality of websites in a mapping of websites to mobile applications. The method also includes generating positive training examples for an action suggestion model from the queries, each positive training example having a query, a website, a weight corresponding to a rank of the website in the search result for the query, and a mobile application, and training the action suggestion model using the positive training examples.

This and other aspects can include one or more of the following features. For example, the method may also include identifying a website in a manifest of a first mobile application and adding the website and the first mobile application to the mapping. As another example, the method may also include clustering similar mobile applications in a web store, the first mobile application appearing in a first cluster, identifying a query where the website is highly ranked, verifying that a search result for the query generated by the first mobile application is similar to a search result for the query generated by a second mobile application, the second mobile application being in the first cluster, and adding, responsive to the verifying, the website and the second mobile application to the mapping. As another example, the method may also include personalizing the model based on search records stored on a mobile device. As another example, the method may include pushing the model to a client device and personalizing the model based on search records associated with a user of the client device.

According to certain aspects of the disclosure, a method may include converting, responsive to receiving an action suggestion indication, a selection made via a display device of a mobile computing device into a query, predicting at least one mobile application for the query using an action suggestion model, the action suggestion model being trained to predict mobile applications given a query, and initiating display of a selectable control for the at least one mobile application on the display device.

This and other aspects can include one or more of the following features. For example, the method may also include receiving a selection of the selectable control and initiating a search intent using the query to the mobile application. As another example, initiating display of the selectable control includes displaying an icon for the mobile application. As another example, converting the selection into a query can include determining extensions for the selection to generate at least one extended query, providing the extended query to the an action suggestion model to generate a second mobile application, initiating display of the at least one extended query, and responsive to receiving a selection of the extended query, initiating display of a selectable control for the second mobile application. As another example, at least one of the mobile application may not be installed on the mobile device and the method further includes receiving a selection of the selectable control; and initiating installation of the mobile application on the mobile device.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
a display device;
at least one processor; and
memory storing instructions that, when executed by the at least one processor, cause the mobile device to:
receive, at the mobile device and from a remote server, an action suggestion model, the action suggestion model being trained, using training examples obtained from search records of previously submitted queries from a plurality of users, to predict one or more actions in response to a corresponding query, each of the one or more actions being associated with a corresponding mobile application,
generate, at the mobile device, additional training examples based on the search records of previously submitted queries from a user of the mobile device,
further train, at the mobile device, the action suggestion model subsequent to receiving the action suggestion model, wherein in further training the action suggestion model the mobile device is to train the action suggestion model using the additional training examples to generate a personalized action suggestion model that is personalized to the user,
store, at the mobile device, the personalized action suggestion model, and
subsequent to further training the action suggestion model to generate the personalized action suggestion model:
receive, at the mobile device, a user selection of textual content that is displayed via the display device of the mobile device and that is not in query form; and
in response to receiving the user selection of the textual content:
convert, at the mobile device, the user selection of the textual content, that is not in query form, made via the display device into a particular query, that is in query form, for the textual content;
provide, at the mobile device, the particular query to the personalized action suggestion model, that is stored at the mobile device, to predict at least one of the one or more actions based on the particular query; and
output, at the mobile device, the at least one of the one or more actions that are predicted based on the particular query via the display device.

2. The mobile device of claim 1, wherein in generating the additional training examples based on the search records, the mobile device is to:
identify whitelisted websites in the search records; and
generate the training examples from queries that include the whitelisted websites as highly ranked.

3. The mobile device of claim 1, wherein the memory further stores instructions that, when executed by the at least one processor, causes the mobile device to:
initiate display of the one or more predicted actions on the display device.

4. The mobile device of claim 3, wherein the memory further stores instructions that, when executed by the at least one processor, causes the mobile device to:
receive a selection of one of the one or more predicted actions; and
initiate an intent using the query for the mobile application associated with the selection.

5. The mobile device of claim 1, wherein initiating display of the one or more predicted actions includes for each predicted action, displaying an icon for the mobile application associated with the predicted action.

6. The mobile device of claim 5, wherein the icons for the one or more predicted actions overlay content displayed on the display device.

7. The mobile device of claim 1, wherein the selection is of the textual content that is displayed via the display device, and wherein the particular query is for the textual content.

8. The mobile device of claim 7, wherein the selection of the textual content is received via touch input directed to the display device, and wherein, in converting the selection made into the particular query for the textual content, the mobile device is to:
identify, based on the touch input, one or more terms; and
use the one or more terms as the particular query for the textual content.

9. The mobile device of claim 7, wherein the selection of the textual content is received via a voice command, and wherein, in converting the selection made into the particular query for the textual content, the mobile device is to:

perform word recognition, on the voice command, to generate one or more recognized words; and
use the one or more recognized words as the particular query for the textual content.

10. A method implemented by one or more processors of a mobile device, the method comprising:
receiving, at the mobile device and from a remote server, an action suggestion model, the action suggestion model being trained, using training examples obtained from search records of previously submitted queries from a plurality of users, to predict one or more actions in response to a corresponding query, each of the one or more actions being associated with a corresponding mobile application;
generating, at the mobile device, additional training examples based on the search records of previously submitted queries from a user of the mobile device;
further training, at the mobile device, the action suggestion model subsequent to receiving the action suggestion model, wherein further training comprises using the additional training examples to generate a personalized action suggestion model that is personalized to the user;
storing, at the mobile device, the personalized action suggestion model;
subsequent to further training the action suggestion model to generate the personalized action suggestion model:
receiving, at the mobile device, a user selection of textual content that is displayed via a display device of the mobile device and that is not in query form; and
in response to receiving the user selection of the textual content or the image:
converting, at the mobile device, the user selection of the textual content, that is not in query form, made via the display device into a particular query, that is in query form, for the textual content;
providing, at the mobile device, the particular query to the personalized action suggestion model, that is stored at the mobile device, to predict at least one of the one or more actions based on the particular query; and
outputting, at the mobile device, the at least one of the one or more actions that are predicted based on the particular query via the display device of the mobile device.

11. The method of claim 10, wherein generating the additional training examples comprises:
identifying whitelisted websites in the search records; and
generating the training examples from queries that include the whitelisted websites as highly ranked.

12. The method of claim 10, further comprising:
initiating display of the one or more predicted actions on the display device.

13. The method of claim 12, further comprising:
receiving a selection of one of the one or more predicted actions; and
initiating an intent using the query for the mobile application associated with the selection.

14. The method of claim 10, wherein initiating display of the one or more predicted actions comprises for each predicted action, displaying an icon for the mobile application associated with the predicted action.

15. The method of claim 14, wherein the icons for the one or more predicted actions overlay content displayed on the display device.

16. A non-transitory computer-readable storage medium storing instructions that, when executed, cause one or more processors to perform operations, the operations comprising:
receiving, at the mobile device and from a remote server, an action suggestion model, the action suggestion model being trained, using training examples obtained from search records of previously submitted queries from a plurality of users, to predict one or more actions in response to a corresponding query, each of the one or more actions being associated with a corresponding mobile application;
generating, at the mobile device, additional training examples based on the search records of previously submitted queries from a user of the mobile device;
further training, at the mobile device, the action suggestion model subsequent to receiving the action suggestion model, wherein further training comprises using the additional training examples to generate a personalized action suggestion model that is personalized to the user;
storing, at the mobile device, the personalized action suggestion model;
subsequent to further training the action suggestion model to generate the personalized action suggestion model:
receiving, at the mobile device, a user selection of textual content that is displayed via a display device of the mobile device and that is not in query form; and
in response to receiving the user selection of the textual content:
converting, at the mobile device, the user selection of the textual content, that is not in query form, made via the display device into a particular query, that is in query form, for the textual content;
providing, at the mobile device the particular query to the personalized action suggestion model, that is stored at the mobile device, to predict at least one of the one or more actions based on the particular query; and
outputting, at the mobile device, the at least one of the one or more actions that are predicted based on the particular query via the display device of the mobile device.

* * * * *